Sept. 25, 1951  A. DEWANDRE  2,568,722

COMPRESSED FLUID DISTRIBUTOR

Filed April 17, 1946

Inventor
A. Dewandre

Patented Sept. 25, 1951

2,568,722

UNITED STATES PATENT OFFICE 2,568,722

COMPRESSED FLUID DISTRIBUTOR

Albert Dewandre, Brussels, Belgium

Application April 17, 1946, Serial No. 662,901
In Belgium January 30, 1943

Section 1, Public Law 690, August 8, 1946
Patent expires January 30, 1963

3 Claims. (Cl. 188—3)

My invention relates to a distributor of compressed fluid, more especially for the braking of trailers, in which a reaction piston subjected to the active pressure of the fluid acts upon the control member in a direction opposed to the force exerted by the driver upon the said member.

Known distributors of this type generally comprise one or more springs the resistance of which increases with the displacements of the driving member. These devices exhibit the disadvantage of requiring on the part of the operator an effort which increases throughout the displacement of the driving member, and of introducing into the control a supplementary resistance if the fluid fails.

The object of the present invention is to remedy these defects by providing a reaction distributor in which the effort to be exerted by the driver is proportional to the active pressure of the fluid during a definite stroke of the driving member, and then remains constant during the entire remainder of the displacement of the said control member when the fluid pressure is a maximum in the member controlled. Furthermore if the fluid fails, the entire movable part of the distributor can be displaced without resistance.

According to the invention the reaction piston of the distributor is connected on the one hand to a second piston, which is subjected constantly to the maximum pressure of the fluid, and on the other hand, through the medium of a system of articulated levers, to the brake gear, an elastic means of limited stroke being provided in the connection that connects the said second piston to the said brake gear, permitting the displacements of the said reaction piston under the action of the fluid admitted until the moment when the latter reaches its maximum pressure in the brake cylinders of the trailer.

One embodiment of the invention will be described hereunder by way of example with reference to the accompanying drawings, in which.

Figure 1:
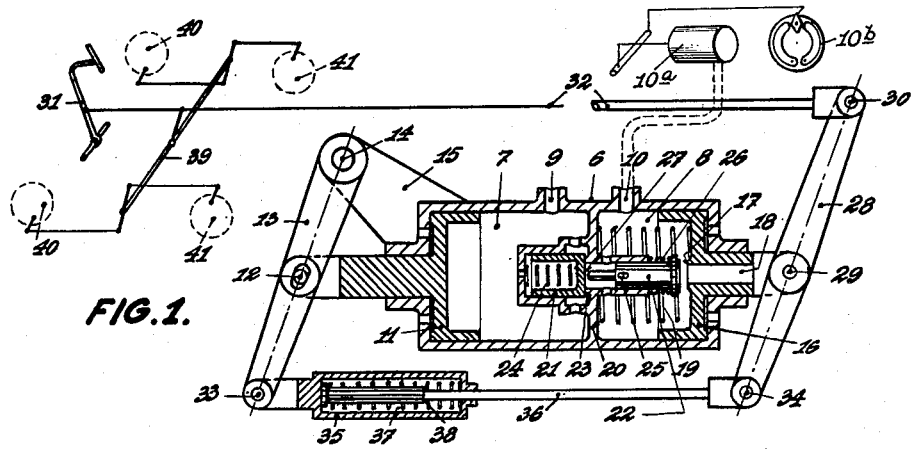
Figure 1 shows diagrammatically a longitudinal section of the distributor in its position of rest, together with the connection of the latter to the rod-and-lever mechanism of the tractor.

As shown in Figure 1, the distributor comprises a cylinder 6, divided into two chambers, 7 and 8. The chamber 7 is in communication by way of an aperture 9 with the source of fluid, and the chamber 8, by way of an aperture 10, with a fluid motor 10a operatively connected to a brake 10b, mounted on a trailer, not shown. In the chamber 7 slides a piston 11, connected at 12 to a lever 13 pivoted at 14 to a support 15 rigidly mounted on the cylinder 6. In the chamber 8 of the cylinder 6 slides a piston 16, provided with a valve seat 17, and furnished at the centre with an aperture 18 communicating with the atmosphere. A return spring 19 urges the piston 16 towards the right. The partition 20 that separates the chambers 7 and 8 of the cylinder may be equipped with two valves 21 and 22. The valve 21 is pressed on to its seat 23, provided in the wall 20, by a spring 24, and the valve 22 is pushed against a pin 25 by a spring 26, the pin being mounted in the sleeve which guides the valve stem. The slot in the valve stem, through which the pin extends, is oblong, in order to permit a limited axial movement of the valve. A slight amount of clearance 27 is provided between the valves 21 and 22.

A lever 28, articulated at 29 to the piston 16, is connected at 30 to the control member 31 through the medium of a rod 32. The extremities 33 and 34 of the levers 13 and 28 are articulated to one another by means of a resilient connection composed of a casing 35, a rod 36 and a spring 37. This latter spring is so designed as to compensate for the force exerted by the pressure acting upon the piston 11 when an abutment 38 on the rod 36 comes into contact with the face of the box 35.

The control member 31 is likewise connected to the rod-and-lever mechanism 39 mechanically actuating the front brakes 40 and the rear brakes 41 provided on the tractor.

The chamber 7 of the distributor being in communication with the source of fluid or the reservoir, the pressure of the compressed air acts constantly upon the piston 11.

The distributor operates in the following manner:

If a pull is exerted upon the rod 32, the lever 28, pivoting at 34, moves the piston 16 towards the left. The point 34 is held still on account of the fact that the point 33 of the lever 13 is kept stationary in its extreme left-hand position by the pressure of the air acting upon the piston 11 and by the rod 36, which is likewise urged towards the left by the spring 37. The strength of the spring 37 is made greater than that of the springs 19, 26 and 24. These latter springs serve only to return each of the members towards its initial position, shown in Figure 1. As a result of the first movement of the lever 28, the piston 16 moves into contact with the exhaust valve 22, which in this way is pressed on to its seat 17. From this moment the chamber 8 is isolated from the atmosphere. The chamber 8 however is still at atmospheric pressure. As soon as it is pressed on to its seat, the valve 22 becomes virtually integral with the piston 16. This piston, in continuing its movement toward the left, carries with it the valve 21 through the medium of the valve 22. Compressed air can then pass from the chamber 7 to the chamber 8, and from there to the receiving member. By virtue of the pressure admitted into the chamber 8 the piston 16 is immediately urged towards the right. It thus acts in a direction opposite to that of the force exerted by the operator upon the rod 32. The operator is obliged, if he wishes to keep the valve 21 in its open position, to increase the pull upon the rod 32.

If it is desired to maintain the pressure in the chamber 8, and consequently in the receiving member, at a predetermined value, the operator keeps the rod 32 stationary. The point 30 of the lever 28 becomes fixed, and the piston 16, under the effect of the pressure existing in the chamber 8, moves towards the right until the admission valve 21 comes into contact with its seat 23 and thus isolates the chamber 7 from the chamber 8. In this movement the lever 28 has pivoted about the point 30, and the point 34 of the lever 28 has become displaced towards the right, compressing the compensating spring 37. The force of compression of the spring is proportional to the value of the pressure acting upon the piston 16. At this moment, the admission valve 21 and the exhaust valve 22 being both completely closed, the piston 16 becomes stationary in a position of equilibrium. Consequently the lever 28 also takes up a position of equilibrium under the three following forces:

(1) The force due to the pressure of the air acting upon the piston 16 and applied to the lever 28 at the point 29, this force acting towards the right;

(2) The force due to the pull exerted by the operator, acting towards the left at the point 30 of the lever 28; and (3) The force occasioned by the compensating spring 37, acting towards the left on the lever 28 at the point 34.

From this moment the pressure in the chamber 8 and in the receiving member is stabilized, and will remain stabilized as long as the pull upon the rod 32 does not vary. It will thus be found that the value of the pressure in the receiving member is a function of the tractive effort exerted upon the rod 32.

Figure 2:
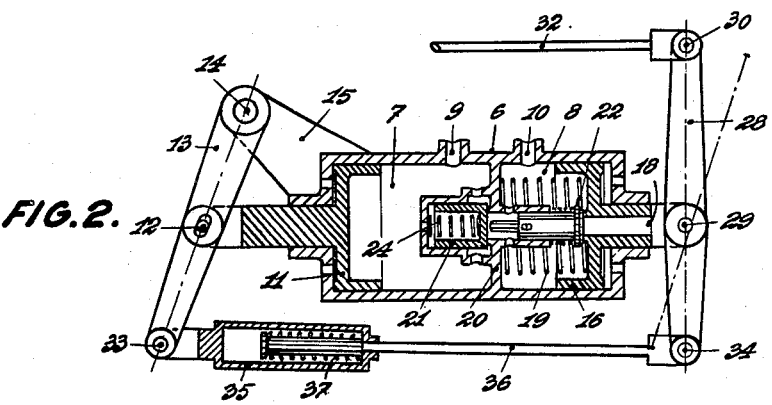
Figure 2 is a similar view showing the position of the parts of the distributor after the first phase of the braking.

When the pressure in the chamber 8 has reached its maximum value, a value which is equal to that in the chamber 7, the abutment 38 on the rod 36 has come into contact with the casing 35, and the position of the parts is that represented in Figure 2. At this moment the force due to the pressure of the air acting upon the piston 11 and transmitted to the point 12 of the lever 13 is equal to the force of the spring 37 acting upon the casing 35 and transmitted to the point 33 of the lever 13. The composite unit constituting the resilient connection 35, 36 and 37 has become a rigid connection.

At this moment the maximum value of the braking of the trailer has been reached. If the pull upon the rod 32 is further increased, owing to a need for further displacement in the tractor brakes, it will be found that the lever 28 pivots about the point 29, the displacement of the piston 16 being limited by a stop 25, and the point 34 carrying with it, by means of the rod 36, which has become virtually integral with the casing 35, the lever 13, and consequently the piston 11. As stated above, however, the force of the piston 11 being balanced by the spring 37, any additional displacement of the rod 32 is effected under a constant effort, which corresponds to the force exerted by the pressure upon the piston 16. Consequently the first part of the stroke of the pedal is utilized for the functioning of the brakes of the trailer, and at the same time brings the brake shoes of the tractor into contact with the drums. It will be seen from this that the braking of the trailer is effected before that of the tractor. Similarly in the event of a failure of fluid, the operator can displace without resistance the mechanism constituted by the lever, the piston and the semi-resilient connection, while still acting upon the brakes of the tractor.

Figure 4:
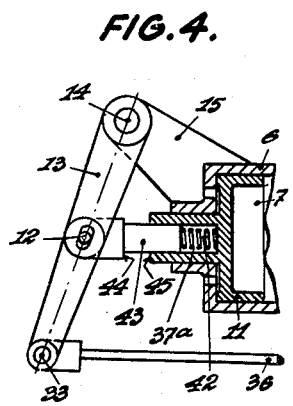
Figure 4 is a partial view of the distributor, showing a modification in the application of the resilient system provided in the device.
Figure 3:
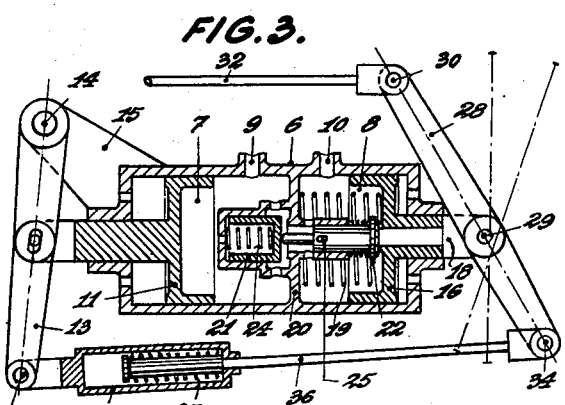
Figure 3 shows the fresh position assumed by the members of the distributor after the second stage of the braking.

In Figure 4 the resilient means, of limited stroke, permitting the displacement of the reaction piston 16 under the action of the fluid admitted into the chamber 8, instead of being provided upon the rod 36 connecting the levers 13 and 28, has been arranged between the articulation 12 and the piston 11.

For this purpose, in a bore 42 formed in the rod of the piston 11, slides a rod 43, supporting at one of its ends the articulation 12. A spring 37a interposed between the rod 43 and the piston 11 permits a resilient displacement of the said rod in relation to the said piston, this displacement being limited by the stops 44 and 45, formed upon the rod 43 and the piston 11 respectively.

It is easy to verify that the functioning of the distributor at the time of the actuation of the control member 31 is identical with that described above.

The resilient means of limited stroke might similarly be arranged, with an equivalent result, either between the piston 16 and the articulation 29 of the lever 28, or upon the rod 32, between the brake gear 39 and the point of articulation 30 of the lever 28.

What I claim is:

1. For use in a tractor braking system having brakes and a brake control lever directly connected to said brakes to actuate the same, a control valve device, adapted to actuate a trailer power braking system, comprising a casing, a pressure responsive movable member in said casing connected to said brake control lever, inlet and exhaust valve elements in said casing controlled by said pressure responsive movable member, means for opposing movement of said brake control lever with a pressure proportional to the controlled pressure during a predetermined part of the stroke of the brake control lever, and means for permitting additional brake-applying movement of said brake control lever without an increase of effort over that required when the controlled pressure reaches its maximum value.

2. For use in a tractor braking system having brakes and a brake control lever directly connected to said brakes to actuate the same, a control valve device, adapted to actuate a trailer power braking system, comprising a casing divided into two compartments, a pressure responsive movable member in one of said compartments arranged to be moved by said brake control lever and acted upon by a differential pressure opposing brake-applying movement of said brake control lever, a spring acting on said pressure responsive member to oppose such movement, inlet and exhaust valves in said compartment, a second pressure responsive movable member in the other compartment which is constantly acted on by the pressure of fluid from a pressure source, mechanism connecting one of said pressure responsive movable members to the other and to the brake control lever, and means permitting movement of the first pressure responsive movable member independently of the second pressure responsive movable member during a part of the brake control lever stroke, until the controlled pressure reaches the maximum pressure of the fluid pressure source.

3. For use in a tractor braking system having brakes and a brake control lever directly connected to said brakes to actuate the same, a control valve device, adapted to actuate a trailer power braking system, comprising a casing divided into two compartments, a pressure responsive movable member in one of said compartments arranged to be moved by said brake control lever, a spring acting on said pressure responsive member to oppose such movement, inlet and exhaust valves in said compartment, a second pressure responsive movable member in the other compartment which is constantly acted on by the pressure of fluid from a pressure source, a first lever supported by the first pressure responsive movable member and connected at one end to the brake control lever, a second lever pivotally connected to the second pressure responsive movable member and connected to the other end of the first lever, the opposite end of the second lever being pivoted on a fixed point, and a calibrated spring of limited stroke interposed in the connection between the two levers.

ALBERT DEWANDRE.

REFERENCES CITED

The following references are of record in the file of this patent:

UNITED STATES PATENTS

| Number | Name | Date |
|---|---|---|
| 1,588,658 | Christensen | June 15, 1926 |
| 1,588,660 | Christensen | June 15, 1926 |
| 1,940,550 | Kazenmaier | Dec. 19, 1933 |
| 1,970,725 | Atcheson | Aug. 21, 1934 |
| 2,174,139 | Schmutz | Sept. 26, 1939 |
| 2,229,247 | Kamenarovic | Jan. 21, 1941 |

FOREIGN PATENTS

| Number | Country | Date |
|---|---|---|
| 325,806 | Italy | Sept. 17, 1934 |
| 795,492 | France | Mar. 14, 1936 |